Figure 1:
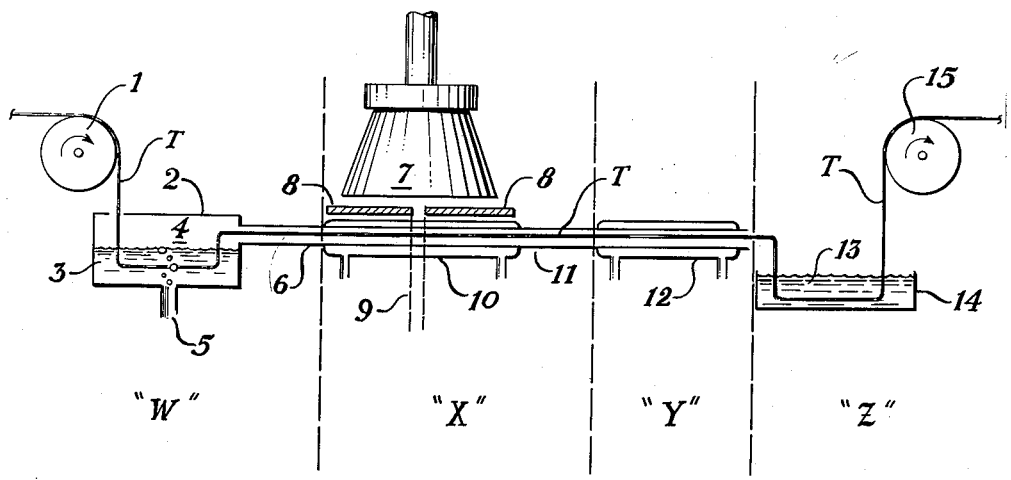

April 11, 1961 C. A. LEVINE 2,979,447
PROCESS FOR THE PREPARATION OF GRAFT COPOLYMERS
Filed July 18, 1958

INVENTOR.
Charles A. Levine
BY
ATTORNEY

United States Patent Office 2,979,447
Patented Apr. 11, 1961

2,979,447

PROCESS FOR THE PREPARATION OF GRAFT COPOLYMERS

Charles A. Levine, Concord, Calif., assignor to The Dow Chemical Company, Midland, Mich., a corporation of Delaware Filed July 18, 1958, Ser. No. 749,478

18 Claims. (Cl. 204—154)

The present invention is germane to the organic chemical arts and contributes more specifically to the field of polymer chemistry. More particularly, the present invention relates to a new and improved process for the preparation of extremely advantageous and highly desirable compositions consisting of graft copolymers on acrylonitrile polymer substrates (particularly polyacrylonitrile) of various graft copolymerized N-vinyl heterocyclic monomers under the influence of high energy radiation.

It is known to prepare graft copolymers of various monomers on various already formed polymeric "backbones" or substrates by means of mutual irradiation under the influence of high energy, wherein and whereby the substrate and the monomer are irradiated while in intimate contact with one another until the monomer has been graft copolymerized upon the already formed polymer to the degree desired. There are certain disadvantages which attend the conventional methods of graft copolymerizing using mutual irradiation, especially as it is generally employed in the art. Thus, the amount of high energy radiation employed may cause degradation of the substrate or induce unwanted side reactions to occur.

In certain instances the problems can be circumvented by accomplishing the irradiation using much lower dose rates of the high energy and effecting the graft with a lower total radiation dosage. While such a technique may obviate difficulties due to diffusion and sensitivity of the system to secondary reactions, the low dosages of high energy radiation are frequently difficult and uneconomical to administer when the ordinarily available high energy radiation generating sources are employed. In addition, mutual radiation processes which employ low dose rates frequently require long irradiation times to accomplish the desired purpose. Oftentimes, for example, several minutes in the high energy field may be necessary to form the desired graft copolymer. This may frequently be disadvantageous, especially if the polymer substrate being graft copolymerized is being handled while being continuously forwarded in the form of a continuous filament textile fiber.

Thus, if the graft copolymerized fiber substrate is being handled at a rate of about 120 feet per minute and a radiation time in a low dose rate process of about 1½ minutes is required, a total of about 180 feet of fiber must be continuously exposed to the high energy field at any given time. Apparatus for the accomplishment of such procedure must literally be foolproof, since any break in the filamentary material being graft copolymerized causes considerable operational difficulties within the radiation unit.

It would be an advantage to provide an improved process for forming graft copolymers of the indicated variety, wherein efficiently high dose rates (such as are obtained from the usually available electron and particle accelerators or fission reaction product radiation sources) might be utilized in systems that are sensitive to dose rate effects.

It is the principal object of the present invention to provide such a better procedure by way of an improved method for enhancing the dyeability or receptivity to various dyestuffs of acrylonitrile polymer substrates, particularly those substrates consisting of linear, fiber-forming acrylonitrile polymers that contain in the polymer molecule at least about 80 weight percent of acrylonitrile (any balance being another ethylenically unsaturated monomeric material copolymerizable with acrylonitrile) and especially polyacrylonitrile.

It is a particular object of the present invention to improve the dye-receptivity of acrylonitrile polymer substrates by forming graft copolymers thereon of various N-vinyl heterocyclic monomers, particularly N-vinyl lactam monomers (including N-vinyl-2-pyrrolidone), N-vinyl-2-oxazolidinone and the like cyclic carbamate monomers and N-vinyl-3-morpholinone monomers.

It is a special object of the invention to enhance the dye-receptivity of acrylonitrile polymer substrates that are in the form of various shaped articles, including filaments, fibers, films and the like and cognate structures by means of formation of graft copolymers thereon of the indicated varieties of monomers under the influence of high energy radiation using ordinarily available apparatus for the purpose.

A specific object of the invention is to improve the dyeability of the shaped articles of acrylonitrile polymers with graft copolymers of the indicated varieties of N-vinyl heterocyclic monomers by accomplishing the graft copolymerization, without degradation or deleterious effect, while the acrylonitrile polymer substrate is in a water hydrated or aquagel form or condition.

A primary object of the invention is to accomplish the foregoing intendments by the utilization of high energy radiation at efficiently high dose rates obtained from ordinarily available apparatus in order to effect or influence the desired graft copolymer formation without occasioning difficulties due to degradation and secondary reactions, and within conventionally short periods of time.

A further object of the invention is to provide an improved method for ameliorating the dyeability of acrylonitrile polymer substrates in a manner which may be closely and effectively controlled by a process which may be efficiently and productively operated.

Another object of the invention is to accomplish the graft copolymerization of the hereinafter more particularly indicated varieties of N-vinyl heterocyclic monomers on acrylonitrile polymer substrates using efficiently and economically high dose rates of high energy radiation for the purpose without degrading or deleteriously affecting either the physical properties or the visual appearance, including color, of the polymer substrate.

Yet another object of the invention is to accomplish the foregoing objects, including the utilization of high energy radiation in the desired graft copolymer formation, on an economical, relatively easy to administer and generally attractive basis.

Further objects and corollary advantages and benefits of the present invention will be manifest in the ensuing description and specification.

Cursorily, and to emphasize its salient and essential features, the process of the present invention solves the problem of protecting sensitive graft copolymerizable systems, while at the same time utilizing high energy radiation sources in a most effective and efficient manner, by irradiating the polymer substrate impregnated with the monomer of the indicated variety desired to be graft copolymerized thereto at a high dose rate for a short period of time that is just long enough to initiate grafts of a few monomer units as graft sites on the polymer backbone; and then letting the grafted chains grow outside the radiation field by applying heat (or other non-degrading conditions which cause polymerization of the reactant impregnant) before the free radical ends of the growing chains have a chance to become inactive and terminate the living grafted chains.

Figure 2:
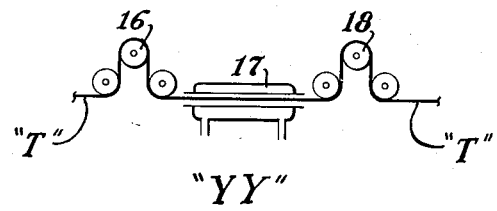

For purposes of specifically illustrating, without intending to thereby limit the invention, the following illustrative examples are provided wherein, unless otherwise indicated, all parts and percentages are to be taken by weight and which were accomplished using apparatus assemblies of the type schematically illustrated in the accompanying drawing in which;

Figure 1 is a schematic representation showing the process and apparatus for irradiating a pre-stretched tow bundle of acrylonitrile polymer fibers in accordance with the present invention; and Figure 2 schematically illustrates the portion of the process and apparatus that is varied in the practice of the invention for the graft copolymerization of a tow bundle fiber that is not prestretched prior to treatment.

With initial reference to Figure 1 of the drawing, there is shown an apparatus assembly consisting of four sequential operating sections, designated "W," "X," "Y" and "Z," respectively. "W" is the impregnation section; "X" is the irradiation section; "Y" is the heat treatment section; and "Z" is the wash section. The tow bundle "T" to be graft copolymerized is handled over a fiber feed roll 1 which may be operated at any desired feed rate but which, during the experimentation hereinafter particularly described, was run at about 30 inches per minute. The impregnating solution of the N-vinyl heterocyclic monomer 3 is maintained in an impregnating bath container 2 (wherein the guide rolls for handling the tow bundles of fibers through the solution are not shown). An oxygen free atmosphere 4 is maintained within the container 2. An inlet 5 is provided at the bottom of the container 2 for admitting nitrogen or other inert gas therein so as to maintain the oxygen free atmosphere 5 over the monomer solution. The impregnated tow bundle is passed from the container through an enclosed wet fiber tube 6 to admit it to the irradiation section "X." In the irradiation section, the high energy is provided from a Van de Graaff generator 7 and is directed on the monomer impregnated tow bundle "T" through a beam shield 8 having an adjustable slit that can be varied between about ½ and about 2 inches in width. Reference numeral 9 designates the beam of high energy radiation generated in the Van de Graaff generator and directed on the monomer-impregnated tow bundle to be graft copolymerized. In the irradiation section, the tow bundle is maintained in a jacketed fiber holder 10 and, after irradiation, is passed through an enclosed tube 11 (having any desired length which, for convenience, is between about 20 and 25 inches) to the heat treatment section "Y." In the heat treatment section, the irradiated, partially graft copolymerized tow bundle "T" is passed through a jacketed fiber heater 12 which, likewise, has any desired length (conveniently, for example, between about 20 and 25 inches). In this connection, it is to be appreciated that the lengths of the tube 11 and the heater 12 are not of particular consequence and are selected to best suit operating conditions under particular circumstances. No limitation is intended by the foregoing specified sizes which may not be preferred or even suitable for all applications. After the heat treatment, the graft copolymerized tow bundle "T" is withdrawn from the heat treatment section "Y" and passed to the wash section "Z," wherein it is passed through a wash bath 13 contained in an open pan 14 (in which the fiber guide rolls are not shown) from which, after drawing, it is taken up for collection about the fiber take-up roll 15.

In the cases when an un-prestretched tow bundle of the acrylonitrile polymer aquagel fiber is to be graft copolymerized, the heat treatment section "YY" shown in Figure 2 is employed in place of the section "Y" illustrated in the first figure of the drawing. In section "YY," the irradiated fiber tow bundle is passed about the set of three relaxed fiber nip rolls 16 through the jacketed fiber heater 17 (having a length of about six inches) and taken up for transfer to the wash section "Z" about the set of three fiber stretch rolls 18 which cause the tow bundle to be stretched during the heat treatment by reason of operation of the stretch rolls 18 at a circumferential rate of speed that is twelve to fifteen times that of the nip rolls 16.

Several samples of a salt-spun, acrylonitrile polymer in aquagel form were saturated with various aqueous solutions of monomeric N-vinyl-2-pyrrolidone (VP). Each of the solutions (excepting those for run 20, described in the following Table 1) contained about 10 percent by weight of the monomer. The impregnating solutions also contained about 0.25 percent by weight of sodium phosphate and 0.25 percent by weight of sodium sulfite as wetting agents in order to ameliorate the impregnation of the vinyl lactam monomer into the aquagel while, at the same time, serving to maintain the impregnating solution in a slightly basic condition. In run 20, as hereinafter described in the accompanying tabulation, the impregnating solution of the monomeric VP was about 3 percent by weight. This impregnating solution also contained the same quantities of the inorganic wetting agents.

The polyacrylonitrile aquagel fiber, which contained about four parts by weight of water in the gel phase to each part by weight of dry polymer in the aquagel structure, had been obtained by extruding a spinning solution comprised of about 10 parts by weight of polyacrylonitrile dissolved in about 90 parts by weight of a 60 percent aqueous solution of zinc chloride into an aqueous coagulating bath that contained about 42 weight percent of zinc chloride dissolved therein. A multiple filament tow was prepared in the spinning operation by extruding the solution through a spinnerette having 750 round orifices, each of about 6 mil diameter. The coagulated tow bundle was washed substantially free from salt after being withdrawn from the coagulating bath. The samples of the tow bundle that were employed for the examples set forth in the following tabulation, had been wet stretched for purposes of orientation to a total stretched length that was about 12 times its original extruded length prior to being impregnated with the monomeric VP solution. The tow bundle utilized for the experiments was prepared in general accordance with the teachings of U.S. Letters Patent No. 2,790,700.

With reference to the drawing for purposes of further explanation of each of the runs that was made, the impregnation with the aqueous solutions of the monomeric VP was performed by passing continuous or endless lengths of the tow "T" through the bath 3 of monomer solution which was protected from the air by the nitrogen blanket 4 in the container 2. After impregnation, the saturated aquagel fiber, bearing about 40 weight percent of the monomer, based on the weight of the fiber (o.w.f.), was then irradiated in an oxygen-free atmosphere at the temperature indicated in the following tabulation by passing it under the electron beam 9 from the Van de Graaff generator 7 which was operated at the potentials and current loads indicated in the tabulation. In the manner suggested by the schematic representation of the drawing, the beam from the accelerator was scanned over a 15 inch length. A shutter absorbed all but 0.5 to 2 inches of the scan, depending upon the dose rate desired in particular instances. This energy from the beam that was absorbed from the fiber tow bundle and its adhering monomer solution impregnated therein corresponds to the dose rate for each run given in the following tabulation in megarad (mr.) per second. In each instance, the wet fiber was pulled under the beam at a rate such that the fiber and its adhering solution actually received the desired dosage of radiation indicated in the tabulation. Within 60 seconds after being removed from the radiation field, the irradiated tow bundles were pulled through the heat treatment section in which the wall of the jacketed fiber heater was maintained at the temperature indicated in the tabulation. The irradiated wet fiber tow bundle was in actual peripheral contact with the wall of the tube and was held within the hot tube for the length of time indicated in the tabulation.

As mentioned in the foregoing, any un-prestretched tow bundles desired to be grafted are passed through a heat treatment section "YY," wherein they are stretched twelve to fifteen times simultaneously with the heat treatment. After irradiation, each of the samples is rinsed thoroughly in the wash section "Z," using water for the purpose. After rinsing, they are irreversibly dried to convert them from the aquagel condition to a finished fiber form, then heat set at 150° C. for 5 minutes.

Each of irradiated graft copolymer-containing fibers was then dyed with 4 percent Calcodur Pink 2BL for about one hour at the boil in a sodium sulfate-containing bath according to conventional procedure in which the dyestuff was present in the bath in an amount that was equal to about 4 percent of the fiber; the sodium sulfate was present in the bath in an amount equal to about 15 percent of the fiber; and ratio of bath-to-fiber was about 30:1.

Calcodur Pink 2BL is a well known direct type of dye of Colour Index Direct Red 75 (formerly Colour Index 353). It is commercially obtainable dyestuff. This distinct variety of direct dyestuff is also available under other designations from several different manufacturers. It is the sodium salt of 3,3-disulphodiphenylurea-4,4'-diazobis-2-amino-8-naphthol-6-sulphonic acid and has the following structural arrangement:

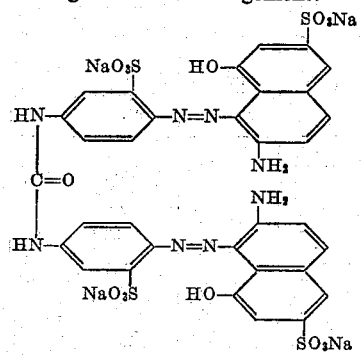

(Calcodur Pink 2BL)

After being dyed, each sample was rinsed in water and dried for about 20 minutes at 80° C. The dye-receptivity of each fiber sample was then evaluated by spectrophotometrically measuring the monochromatic light having a wave length of about 520 millimicrons from a standard source that was reflected from each sample after it had been dyed with 4 percent Calcodur Pink 2BL. A numerical reflectance value was thereby obtained along a numerical scale from 0 to 100. The reflectance value in each case represented the relative comparison of the amount of light that was reflected from the dyed sample with that which was reflected from a standard white tile reflector having an arbitrarily assigned reflectance value according to the numerical scale used of about 316.

As is well known in the art, lower reflectance values are an indication of better dye-receptivity in a given fiber sample. For example, a reflectance value of about 20–25 for acrylonitrile polymer synthetic fibers dyed with 4 percent Calcodur Pink 2BL is generally considered by those skilled in the art to represent a degree of dye-receptivity that readily meets or exceeds the most rigorous practical requirements and is ordinarily assured of receiving general commercial acceptance and approval. The percentage of N-vinyl-2-pyrrolidone graft copolymer that was formed on the polyacrylonitrile substrate was determined by infrared spectroscopy techniques. In the following tabulation there is set forth a summary of the experimental results which were obtained with each of the samples. The symbol "VP" stands for N-vinyl pyrrolidone monomer and the expression "PVP" indicates N-vinyl pyrrolidone graft copolymer.

*Table 1*

TABLE OF EXAMPLES

| Example Number | Current, Microamp. | Dose Rate, Megarad/Sec. | Total Dose, Megarad | Irradiation Temp., ° C. | Heating Temp., ° C. | Heating Time, Sec. | Reflectance | Percent PVP, owf |
|---|---|---|---|---|---|---|---|---|
| 1A | 1 | .083 | .29 | 50 | 120 | 13.6 | 30 | (¹) |
| B | 5 | | 1.44 | | | | 35 | (¹) |
| C | 30 | | 8.6 | | | | 9 | (¹) |
| 2A | 0 | 0 | 0 | 50 | 120 | 68 | 35 | (¹) |
| B | 1 | .083 | 1.88 | | | | 25 | (¹) |
| C | 5 | .42 | 9.4 | | | | 9 | (¹) |
| D | 10 | .84 | 18.4 | | | | 9 | (¹) |
| 3A | 0 | 0 | 0 | 50 | 130 | 41.5 | 60 | (¹) |
| B | 5 | .416 | 3.13 | | | | 18 | (¹) |
| C | 5 | .55 | 3.13 | | | | 20 | (¹) |
| D | 5 | .83 | 3.13 | | | | 24 | (¹) |
| E | 5 | 1.67 | 3.13 | | | | 24 | (¹) |
| F | 5 | 3.32 | 3.13 | | | | 24 | (¹) |
| 4A | 0 | 0 | 0 | 50 | 160 | 41.5 | 70 | (¹) |
| B | 5 | .416 | 3.13 | | | | 20 | (¹) |
| C | 5 | .55 | 3.13 | | | | 20 | (¹) |
| D | 5 | 1.67 | 3.13 | | | | 20 | (¹) |
| E | 5 | 3.32 | 3.13 | | | | 20 | (¹) |
| 5A | 2 | .067 | .25 | 50 | 165 | 41.5 | 20 | (¹) |
| B | | | .62 | | | | 15 | (¹) |
| C | | | 1.25 | | | | 10 | (¹) |
| 6A | 5 | .166 | .62 | 50 | 165 | 41.5 | 14 | (¹) |
| B | | | 1.56 | | | | 10 | (¹) |
| C | | | 3.13 | | | | 9 | (¹) |
| 7A | 16 | .53 | 1.0 | 50 | 165 | 41.5 | 18 | (¹) |
| B | | | 2.0 | | | | 10 | (¹) |
| C | | | 5.0 | | | | 9 | (¹) |
| D | | | 10.1 | | | | 8 | (¹) |

*Table 1*—Continued

TABLE OF EXAMPLES

| Example Number | Current, Microamp. | Dose Rate, Megarad/Sec. | Total Dose, Megarad | Irradiation Temp., °C. | Heating Temp., °C. | Heating Time, Sec. | Reflectance | Percent PVP, owf |
|---|---|---|---|---|---|---|---|---|
| 8A | 10 | 3.7 | .4 | 50 | 143 | 42 | 30 | (1) |
| B | 30 | 11 | 1.2 |  |  |  | 23 | (1) |
| C | 50 | 18.3 | 2.1 |  |  |  | 18 | (1) |
| D | 100 | 36.6 | 4.1 |  |  |  | 12 | (1) |
| E | 150 | 55 | 6.3 |  |  |  | (2) | (1) |
| F | 200 | 73 | 8.2 |  |  |  | (2) | (1) |
| 9A | 10 | 3.7 | .8 | 50 | 144 | 42 | 32 | (1) |
| B | 30 | 11 | 2.5 |  |  |  | 23 | (1) |
| C | 50 | 18.3 | 4.2 |  |  |  | 18 | (1) |
| D | 100 | 36.6 | 8.3 |  |  |  | 12 | (1) |
| E | 150 | 55 | 12.5 |  |  |  | 10 | (1) |
| 10 | 50 | 18.3 | 2.1 | 50 | 165 | 42 | 35 | (1) |
| 11A | 0 | 0 | 0 | 50 | 155 | 42 | uneven | 4.2 |
| B | 20 | 2.8 | .104 |  |  |  | 70 | 4.8 |
| C | 20 | 2.8 | .208 |  |  |  | 60 | 5.5 |
| D | 20 | 2.8 | .416 |  |  |  | 35 | 7.0 |
| E | 20 | 2.8 | .832 |  |  |  | 15 | 7.6 |
| 12A | 20 | 2.8 | .62 | 50 | 155 | 42 | 30 | 7.6 |
| B |  |  | .83 |  |  |  | 23 | 9.4 |
| C |  |  | 1.04 |  |  |  | 20 | 10.7 |
| 13A | 20 | 2.8 | .62 | 80 | 125 | 125 | 12 | 11.7 |
| B |  |  | .83 |  |  |  | 11 | 10.9 |
| C |  |  | 1.04 |  |  |  | 9 | 11.3 |
| 14A | 20 | 2.8 | .62 | 50 | 110 | 124 | 14 | 10.1 |
| B |  |  | .94 |  |  |  | 11.5 | 10.1 |
| C |  |  | 1.24 |  |  |  | 11 | 10.5 |
| 15A | 20 | 2.8 | .62 | 71 | 110 | 124 | 18 | 9.0 |
| B |  |  | .94 |  |  |  | 14 | 10.0 |
| C |  |  | 1.24 |  |  |  | 10.5 | 11.9 |
| 16A | 5 | .7 | .078 | 70 | 96 | 124 | 83 | 7.8 |
| B |  |  |  |  | 108 |  | 55 | 7.2 |
| 17A |  |  | .156 |  | 109 |  | 38 | 9.2 |
| B |  |  | .195 |  | 110 |  | 25 | 9.6 |
| C |  |  | .234 |  | 110 |  | 19 | 9.9 |
| D | 5 | .7 | .273 | 70 | 110 | 124 | 12 | 10.3 |
| E |  |  | .292 |  | 110 |  | 15 | 10.7 |
| F |  |  | .312 |  | 109 |  | 16 | 10.8 |
| G |  |  | .468 |  | 110 |  | 9 | 12.3 |
| 18A | 0 | 0 | 0 | 70 | 110 | 124 | 100 | 1.75-1.8 |
| B | 5 | .7 | .195 |  |  |  | 20 | 8.9-11.8 |
| 19A | 0 | 0 | 0 | 70 | 153 | 124 | 100 | 1.5-2.7 |
| B | 20 | 2.8 | .416 |  |  |  | 20 | 7.8-8.8 |
| 20A | 100 | 0 | 0 | 50 | 163 | 42 | 70 | 1.2 |
| B |  | 14 | 4.16 |  |  |  | 38 | 6.0 |

[1] Not determined.
[2] Very low (i.e., darkly covered).

For purposes of further clarifying the foregoing illustrative examples, the ranges of process variables set forth in the foregoing runs and the examples in which they are compared are set forth in the following tabulation.

*Table 2*

| Variable | Range | Example |
|---|---|---|
| a. VP concentration in aqueous impregnating bath, percent by weight. | 10 percent | 1-19 |
|  | 3 percent | 20 |
| b. Current and dose rate | 1-20 microamperes and 0.083-73 megarad/sec. | 1-2, 8-9 |
| c. Dose | 0.10-12.5 megarad |  |
| d. Radiation Temperature | 50° C | 1-12, 14, 20 |
|  | 70° C | 15-19 |
|  | 80° C | 13 |
| e. Post Heat tube temperature. | 96-165° C |  |
| f. Post heat time | 14-125 sec |  |

In order to illustrate that the practice of the present invention does not substantially or objectionably degrade the graft copolymerized polymer substrate or impair its physical properties, several of the wet and dry physical properties of several of the above included fiber samples were obtained before and after processing. The results are set forth in the following tabulation, in which there is included (for purposes of comparison) the same properties of a fiber comprised of a physical blend (devoid of graft copolymeric constituents) of fiber-forming polyacrylonitrile containing about 10 percent (o.w.f.) of about K-55 poly-N-vinyl-2-pyrrolidone intimately and thoroughly incorporated in the composition as a polymeric dye-assisting adjuvant.

*Table 3*

| Type of Composition | State | Run No. | Denier | Tensile Strength, gm./denier | Extension, Percent | Yield Strength, gm./denier | Young's Modulus [a] |
|---|---|---|---|---|---|---|---|
| Graft Copolymer. | Dry | Blank | 3.0 | 3.9 | 39 | 1.16 | 36 |
| Do | do | 4C | 3.9 | 2.8 | 37 | 0.75 | 27 |
| Do | do | 9D | 3.7 | 3.0 | 40 | 0.70 | 30 |
| Do | do | 10 | 3.6 | 3.0 | 53 | 0.72 | 31 |
| Do | Wet | Blank | 3.1 | 2.6 | 48 | 1.04 | 38 |
| Do | do | 18B | 2.9 | 2.6 | 36 | 0.80 | 31 |
| Do | do | 19B | 3.1 | 2.2 | 38 | 0.72 | 32 |
| Polymer Blend. | Dry |  | 3.5 | 3.5 | 35 | 1.05 | 35 |
| Do | Wet |  | 3.1 | 3.1 | 40 | 0.95 | 30 |

[a] Expressed in units of $10^3$ kg./cm.$^2$.

Excellent results similar to the foregoing may also be achieved when polyacrylonitrile and other of the herein contemplated, known, fiber-forming acrylonitrile polymer substrates are modified, using the above illustrated procedures, with graft copolymers of N-vinyl-2-pyrrolidone; N-vinyl caprolactam; N-vinyl piperidone; N-vinyl-5-methyl-2-pyrrolidone; N-vinyl-3,3-dimethyl-2-pyrrolidone; N - vinyl - 3,3 - dimethyl piperidone; N - vinyl-2-oxazolidinone; N - vinyl - 5 - methyl-2-oxazolidinone; N-vinyl-5-ethyl - 2 - oxazolidinone; N-vinyl-4,5-dimethyl oxazolidinone; N - vinyl-2-oxazinidinone; N-vinyl-6-methyl-2-oxazinidinone; N - vinyl - 3 - morpholinone; N-vinyl-5-methyl-3-morpholinone; and other of the N-vinyl heterocyclic monomers hereinafter indicated to be within the scope of the present invention.

Excellent results are also achieved when the foregoing is repeated using high energy radiation from any of the other sources hereinafter mentioned.

As is apparent, the greatest advantage in the practice of the invention can generally be achieved when the acrylonitrile polymer substrate being modified is polyacryonitrile. However, as has been indicated and if so desired, various copolymers of acrylonitrile, especially fiber-forming copolymers may be utilized with great benefit.

The N-vinyl heterocyclic monomers which may be employed in the present method include the various N-vinyl cyclic amides and N-vinyl cyclic carbamates of the respective formulae:

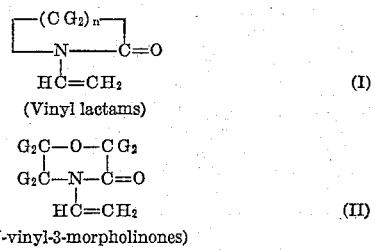

and

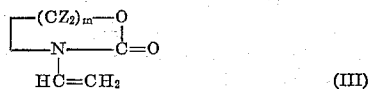

(N-vinyl-2-oxazolidinones and N-vinyl-2-oxazinidinones); wherein each G is independently selected from the group consisting of hydrogen and alkyl radicals of from 1 to about 4 carbon atoms; each Z is independently selected from the group consisting of hydrogen, alkyl radicals of from 1 to about 4 carbon atoms and aryl radicals containing from 6 to about 10 carbon atoms; $n$ is an integer from 3 to 5; and $m$ is an integer from 2 to 3.

The N-vinyl lactams and many of their derivative products, as have been disclosed in United Letters Patents Nos. 2,265,450; 2,335,454; and in many other places, are very useful and widely employed materials. Likewise, many of the N-vinyl-2-oxazolidinones and related N-vinyl cyclic carbamates have great utility and provide for many benefits and advantages in numerous applications, particularly as regards their polymeric and resinous derivatives. Monomeric N-vinyl-2-oxazolidinones devoid of ring substitution other than hydrogen (and, of course, the characteristic carbonyl unit) have been disclosed in United States Letters Patents Nos. 2,786,043; 2,818,362; and 2,818,399.

The acrylonitrile polymer aquagel substrates upon which the N-vinyl heterocyclic monomers are graft copolymerized in the practice of the invention are hydrated forms of the polymer. As is well known, aquagels are usually obtained by extruding a spinning solution or equivalent composition of the acrylonitrile polymer into an aqueous coagulating bath wherein the spinning solvent in the extruded filamentary structure is replaced to a large extent with water. Such water swollen or hydrated structures, which frequently are prepared in the form of films and filaments, can advantageously be prepared by extruding spinning solutions or other spinnable dispersions of fiber-forming acrylonitrile polymers in polyacrylonitrile-dissolving aqueous saline solvents into aqueous, non-polymer-dissolving coagulating spin bath solutions of the same salt or salts as used in the spinning solution. Advantageously, zinc chloride or its saline equivalents for such purpose are utilized, including such salts as calcium or other thiocyanates (as disclosed in U.S. Patents Nos. 2,140,921 and 2,425,192), lithium bromide and salts of the so-called "lyotropic" series (as disclosed in U.S. Patents Nos. 2,648,592; 2,648,593; 2,648,646; 2,648,648 and 2,648,649). Acrylonitrile polymer aquagel structures may be manufactured with great benefit following the procedure of U.S. Patent No. 2,790,700. Although it is desirable for the amount of water that is in the aquagel structure to at least gravimetrically equal the hydrated polymer that is contained therein, it may oftentimes be preferable for the water-to-polymer weight ratio in the aquagel to be in the neighborhood of from about 1.5:1 to 2.0:1, respectively. Aquagel structures in which the water to polymer weight ratio is as high as 2.5 or 5:1 (and event higher) may also be satisfactorily employed.

If desired, the N-vinyl heterocyclic monomer may be impregnated in the acrylonitrile polymer aquagel substrate without use of a solvent, despite the fact that it is generally more beneficial to prepare the monomeric impregnant in solution, especially in aqueous solution. Besides water, other solvents may be employed which have a swelling influence on acrylonitrile polymers; are capable of dissolving the N-vinyl heterocyclic monomer being utilized; and which do not materially or to any discernible degree inhibit the graft polymerization. For example, ethanol, N-methyl pyrrolidone, dimethyl sulfoxide, dimethyl sulfone, and the like may be used for dissolving the monomeric N-vinyl cyclic amide or N-vinyl cyclic carbamate or mixtures thereof that is being graft copolymerized on the substrate. Likewise, aqueous mixtures of water miscible solvents may be similarly utilized.

It is generally desirable to impregnate the acrylonitrile polymer with sufficient graft copolymer-forming monomers and to conduct the method of the invention so that between about 5 and 20 weight percent, on a dry weight basis and taken on the resulting composition, of graft copolymer is formed on the acrylonitrile polymer substrate. The indicated range of graft copolymer concentration is not an essential criticality. In many instances, satsifactory results may be obtained with more or less of the graft copolymer being formed. Furthermore, the amount of graft copolymer formed may also be found to vary with particular process conditions which may be involved that tend to influence both the number of graft sites on the polymer substrate and the length of graft copolymer side chains that are obtained. Thus, compositions containing between about 1 and 50 weight percent of graft copolymerized constituents on the acrylonitrile polymer substrate may also be manufactured by practice of the present process and used with benefit for many applications. It is most desirable, incidentally, to graft copolymerize most of the N-vinyl heterocyclic monomeric impregnant to, with and upon the acrylonitrile polymer substrate while the graft copolymerizable mixture is not subject to or under the influence of the high energy radiation.

As indicated in the foregoing, sodium sulfite ($Na_2SO_3$) and sodium tribasic phosphate ($Na_3PO_4$), are the preferred additives for use in the monomeric impregnating solutions in the practice of the present invention. If desired, other inorganic salts or organic detergents besides those indicated may be utilized as wetting agents and other inorganic or organic reducing agents employed. It is generally advantageous to utilize between about 0.05 and 1 percent of the additives that are employed. Most of the additives that may be utilized are good wetting agents, reducing agents, alkalizing agents or combinations thereof. They provide a noticeable improvement, whether used separately or in any desired combination, at individual concentrations as low as 0.01 percent by weight, based on the weight of the impregnating solution, and seem to reach maximum effectiveness at concentrations between about 0.05 and 0.1 percent. As can be appreciated, the wetting agents employed, such as the inorganic, water-soluble phosphate, sulphate or sulphite salts, function to reduce the surface tension of the monomeric impregnating solutions so as to facilitate and secure good and uniform penetration of the monomer into the aquagel. The reducing agents, such as the alkali metal sulphites and bisulphites or phosphites, serve to control the effect of residual oxygen or peroxides which may be present or that which may form in the system during irradiation. The alkalizing agents which are alkaline salts or alkaline buffers, such as alkali metal phosphates and sulphites, control the pH of the system being irradiated so as to provide the most beneficial and advantageous environment (as regards hydrogen ion concentration in the system) for accomplishment of the intended purpose.

It should be taken into account, of course, that the additives are most useful to utilize in connection with aqueous monomer impregnating solutions. The ultimate effect of the additives is to improve the depth and evenness of dyeability in the resulting product. In this connection, particularly when aqueous monomer solutions are being employed, the pH of the monomer solution should be maintained between about 5 and 11, advantageously above about pH 7 so that the monomer solution is of an alkaline nature. In this way, greatest preclusion of the formation of oxygen and hydrogen peroxide as a consequence of the irradiation of water may be achieved. A noticeable decrease in dyeability usually occurs when the monomer impregnating solution has a pH less than about 6. More advantageously, the pH of the monomer impregnating solution is between about 7 and 10, preferably about 8. Obviously, as will occur to those having the skill of their calling, the additive that is employed, regardless of its functional nature, must not be of the type that might inhibit the polymerization reaction. Thus, practically any wetting agent, reducing agent or base that does not have such an undesirable influence may be employed effectively as an additive in the practice of the present method.

It is generally desirable for the concentration of monomer in the impregnating solution, particularly when an aqueous impregnating solution is employed, to be between about 1.5 and 20 weight percent, based on the weight of the solution. Generally, when impregnating solutions containing less than about 3 percent monomer dispersed therein are utilized, the resulting graft copolymer product may be found to have experienced less of an increase in dye-receptivity than might be desired and is easily attained by using impregnating solutions of greater concentration. When the impregnating solution contains more than about 20 weight percent of monomer, increasing proportions of transient homopolymer are formed along with the graft copolymer so as to cause obvious inefficiencies and undesired waste in the process. For most purposes, and aqueous solution containing from 10 to 20 weight percent of the dissolved monomer, especially one at or near the lower end of the indicated preferred range may be found satisfactory. In some instances higher concentrations of monomer in the impregnating solutions tend to lower the total radiation dose that is needed in order to achieve the same degree of dyeability in the graft copolymer-containing product. However, under such conditions, more of the graft copolymer is found having the same level of dyeability, probably for the reason that shorter graft copolymer chains are effected when greater concentrations of the monomer are present.

It is generally preferable in the practice of the present invention to accomplish the graft copolymerization of the impregnated N-vinyl heterocyclic monomer under the initiating influence of the high energy radiation at a temperature in the range from about 10 to 100° C., preferably from about 50 to 90° C. At temperatures higher than the last mentioned value, the acrylonitrile polymer aquagel may frequently be found to undergo shrinkage and cause certain quantities of ungrafted homopolymer of the N-vinyl heterocyclic monomer to be entrained in the structure. Generally, increasing the temperature during the radiation step of the present process, particularly within the indicated limits, provides a graft copolymer product that dyes more evenly and deeply under given conditions. The improvement in dyeability is considerably less substantial when the irradiation is conducted at the freezing point of water. Practice of the present invention generally secures most desirable results when the graft copolymerization is conducted essentially or substantially in the absence of oxygen in both the irradiation and the post heat treatment steps of the process. This can be accomplished, as indicated, by surrounding the system during the graft copolymerization with a blanket of inert gas such as nitrogen or steam (that may be generated from the aquagel during its handling at elevated temperatures). Up to about 1 percent oxygen in the atmosphere that surrounds the substrate being modified can be tolerated at the expense of a slight increase in necessary total dose, if an alkaline impregnating solution is employed or if the irradiation is accomplished at an elevated temperature.

In this connection, it is generally not an advantage to pre-irradiate the polymer substrate which is to be modified by practice of the present invention into a graft copolymer. Relatively poorer dyeability is generally obtained in the resulting product when resort is made to such techniques. The higher the temperature under which the irradiation is performed, the more advantageously greater is the rate of diffusion of reactant molecules through the aquagel fiber structure. However, as is apparent, a maximum temperature limit is predicated by the onset of fiber damage under the influence of heat at undesirably elevated temperatures for unduly long periods of exposure.

Immediately after irradiation, as has been indicated, the draft copolymerizing substrate is subjected to heat treatment to complete the desired graft copolymerization. In the cases when aquagel fiber substrates are being modified, the heat treatment may be accomplished in the indicated manner by pulling the fiber through and in contact with a tube heated externally at such a rate that the fiber and impregnant are heated to approximately, but not appreciably more than 100° C. and sufficient heat is applied to partly but not completely remove water from the aquagel structure. Actual fiber temperatures in the range from, say, 90–102° C., or so, are generally suitable for this purpose.

The delay between the irradiation step and the heat treatment step of the present process should not exceed about 120 seconds and, more advantageously, should be less than about 30 seconds. Thus, better results are generally obtained by commencing the post irradiation heat treatment as quickly as possible after exposure of the graft copolymerizable system to the high energy radiation. It is not essential that the partially graft copolymerized substrate be protected from air during the delay and transfer from the irradiation zone to the heat treating zone, although it is generally desirable to do so. Such protection from oxygen in the air ordinarily affords increases in the permissible delay time.

The essential variables in the heat treatment step are the actual temperature at which the partially graft copolymerized substrate is heated and the amount of water driven off the aquagel structure. Optima depend on the high energy radiation dose and dose rate history. In most cases, the longer the partially graft copolymerized substrate is held at the elevated temperature, the better is its subsequent dyeability. The limit in time results from the fact that the aquagel must not be allowed to irreversibly dry, otherwise its desirable physical characteristics are generally spoliated. In the cases when fiber structures are being graft copolymerized, the variables generally controlled and measured are the heater wall temperature in time with the contact with the heated surface. Of course, with other articles, the actual temperature of the heat to which the partially graft copolymerized structure is elevated is the critical variable as regards such feature.

In addition, in completing the graft copolymerization of any structure (including fibers), there is a region of diminishing rates in the post irradiation heat treatment in holding the article to be draft copolymerized at an elevated temperature for too long a period of time. The grafting rate tends to unavoidably slow down, probably due to the decrease in the available monomer for draft copolymerization. Thus, in instances when polyacrylonitrile fiber is being graft copolymerized in the above described manner with VP and the post irradiation heat treatment is accomplished in a tube held at a 155° C. wall temperature after the fiber and its VP solution have been exposed to a dose of from 0.4 to 0.8 megarad at a dose rate of about 2.8 megarads per second, the optimum time for the heat treatment is found to be from about 40 to 60 seconds. For a tube held at 125° C. with the same fiber system, it is found to be on the order of 125 seconds.

The generally preferred range of variables for the post irradiation heat treatment of fiber tow bundles in the exemplified manner are approximately as follows:

|  | Heater Wall Temperature of Treatment, ° C. | Time of Treatment in Seconds |
|---|---|---|
| Optimum minimum | b 110 | 120-180 |
| Most advantageous | b 140-160 | 40-80 |
| Optimum maximum | c 165 | 20-50 | b Actual fiber temperatures on the order of 90° C.
c Actual fiber temperatures on the order of 102° C.

As is apparent in the foregoing, the actual substrate temperatures achieved during the post irradiation heat treatment are close to but do not materially exceed the boiling point of water under atmospheric pressure or the very moderate pressure (2-3 pounds per square inch, gauge) developed in the open tube for a period of time of perhaps ½ to ⅔ the total residence time in the tube.

Although, as indicated, the partially graft copolymerized substrate can be exposed to air during its transfer from the irradiation section or step of the present process to the post irradiation heat treating section or step, it is also desirable, as has also been indicated, to maintain the graft copolymerizing system during the post heat treatment in an atmosphere that is substantially, if not completely, free from oxygen. As is the case in the irradiation zone, oxygen inhibits completion of the graft copolymerization in the post irradiation heat treating zone. As indicated in the foregoing, if the temperature in the post heating zone is hot enough to cause steam to emerge from the aquagel substrate being graft copolymerized at a rate sufficient to keep air away from the graft copolymerizing system, no purging in the post heat treatment with an inert gas is necessary. Otherwise, purging of the graft copolymerizing system in the post irradiation heat treatment zone with an inert gas, such as nitrogen, is a necessary expedient for optimum results.

The high energy radiation which is employed for inducing the graft copolymerization in the practice of the present invention is of the type which provides emitted particles or photons having an intrinsic energy of a magnitude which is greater than the planetary electron binding energies that occur in the graft copolymerizing materials. Such high energy radiation, as has been illustrated in the foregoing, is conventionally available from various radioactive substances which provide beta or gamma radiation as, for example, various radioactive forms of elements, including cobalt-60 and cesium-137; nuclear reaction fission products and the like. If it is preferred, however, as has been indicated in the foregoing, high energy radiation from such sources as electron beam generators, including linear accelerators and resonant transformers; X-ray generators and the like may also be utilized. The high energy ionizing radiation of the type contemplated as being useful in the practice of the present process is capable of penetrating 0.1 mm. of aluminum or similar density material. This distinguishes it from ultraviolet light, which is stopped at the surface of such a barrier. Thus, beta and gamma rays are easily capable of penetrating aluminum foil. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided).

In general, the operable range of total irradiation dosage of the metal-penetrating, ionizing, high energy radiation in the practice of the present invention is roughly between about 0.2 and about 10 megarads. A more advantageous range of dosage is between about 0.4 and 5 megarads. As will be appreciated by those who are skilled in the art, it is difficult to prescribe absolute operable limits with inflexible certainty. Ordinarily, lower dosages are more convenient and economical to effect and handle. Lower doses also minimize the possibility of change or deterioration in the polymer substrate being modified. All other conditions being equal (and ignoring particular characteristics of the graft copolymer formed), greater total doses tend usually to achieve greater total amounts of graft copolymer formed on the substrate.

As is apparent, a significant and critical feature of the present invention lies in the completion of the graft copolymerization with the post irradiation heat treatment after utilizing conventional levels of irradiation during the radiation step to cause partial accomplishment of the graft copolymerization and establish conditions conducive to its satisfactory accomplishment in the post irradiation heat treatment. In this way, significantly greater doses of high energy radiation which may deleteriously affect the polymer substrate may advantageously be avoided. This is a matter of not insignificant consequence, since it is known that doses of high energy radiation on the order of 200 million rep. (roentgen equivalent physical) have a definite adverse effect, including discoloration, on the physical properties of acrylonitrile polymers, particularly those intended for fiber and the like applications.

The total dose required in the practice of the present invention is roughly proportional to the square root of the dose rate used following a relationship between dose and dose rate that may be expressed by the equation: $R = KI^{\frac{1}{2}}$, wherein R is the total dose in megarad, K is an arbitrary constant and I is the dose rate in megarad per second. The numerical value of K may be taken between 400 and 650, preferably from about 450 to 600.

Its value, as indicated in the following tabulation, has been calculated for several typical cases.

| R (Dose, megarad) | I (Dose rate, Mr./Sec.) | K |
|---|---|---|
| 0.4 | 0.521 | 556 |
| 1.1 | 3.7 | 574 |
| 1.5 | 11 | 455 |
| 4.6 | 90.5 | 484 |

When using electron generators as the source of high energy radiation, the dose rate is proportional to the beam current, given constant voltage, radiation time and irradiated sample weight. This relationship may be described by the equation:

$$\text{Dose rate} = \text{current} \times \text{voltage} \times \frac{\text{time}}{\text{sample weight}}$$

The ratio of radiation time to sample weight is proportional to the speed at which the irradiated article, such as a fiber tow bundle, is being passed longitudinally through the irradiation field. Of course, with stationary articles, no such ratio is involved. As is apparent, equivalent relationships may be derived when other sources of high energy are utilized by substituting the field intensity for the product of current multiplied by voltage in the foregoing equation.

A megarad (mr.) is one million rads. A rad is the amount of ionizing high energy radiation which produces an absorption of 100 ergs of energy per gram of absorbing material. This unit is widely accepted as a convenient means of measuring radiation absorption of materials. It is defined in "Radiation Dosimetry" by Hine and Brownell, Academic Press (1956). A rep. may be similarly defined, for purposes of comparison, as the amount of ionizing high energy radiation required to produce an energy absorption of 83 ergs per gram of absorbing material, i.e., that of one roentgen.

The modified polymer products, particularly filamentary products, prepared in accordance with the present invention have excellent physical properties and other desirable characteristics especially when they are obtained in a form that is suited for use as a textile material. The modified products have a high capacity for and are readily and satisfactorily dyeable to deep and level shades of coloration with any of a wide variety of dyestuffs. For example, they may be easily and successfully dyed according to conventional procedures using acid, vat, acetate, direct, naphthol and sulfur dyes. Such dyestuffs in addition to Calcodur Pink 2BL, by way of didactic illustration, as Calcocid Alizarine Violet, Sulfanthrene Red 3B, Amacel Scarlet BS, Naphthol ASMX, Fast Red TRN salt and Immedial Bordeaux G may advantageously be employed for such purposes.

Other dyestuffs, by way of further illustration, that may be utilized beneficially on the graft copolymerized products of the invention include such direct cotton dyes as Chlorantine Fast Brown CLL, Chlorantine Fast Green 5BLL, Chlorantine Fast Red 7B, Pontamine Green GX Conc. 125 percent, Calcomine Black EXN Conc., Niagara Blue NR and Erie Fast Scarlet 4BA; such acid dyes as Anthraquinone Green GN, Anthraquinone Blue AB, Sulfonine Brown 2B, Sulfonine Yellow 2G, Neutracyl Brown RD, Xylene Milling Black 2B, Xylene Milling Blue FF, Xylene Fast Rubine 3GP PAT, Calcocid Navy Blue R Conc., Calcocid Fast Blue BL, Calcocid Milling Red 3R, Alizarine Levelling Blue 2R, Amacid Azo and Yellow G extra; such mordant-acid dyes as Alizarine Light Green GS, and Brilliant Alizarine Sky Blue BS PAT; such vat dyestuffs as Midland Vat Blue R powder, Sulfanthrene Brown G paste, Sulfanthrene Black PG Dbl., Sulfanthrene Blue 2B Dbl. paste and Sulfanthrene Red 3B paste, Indigoaol Green IB powder, a soluble vat dyestuff; such acetate dyes as Celliton Fast Brown 3RA Extra CF, Celliton Fast Rubine BA CF, Artisil Direct Black FKZ, Artisil Direct Navy SR, Artisil Direct Red 3BP, Celanthrene Pure Blue BRS 400 percent, Celanthrene Red 3RB Conc., Acetamine Orange 3R Conc. and Acetamine Yellow N; B-Napthol←2-chloro-4-nitroaniline, an azoic dye; such sulfur dyes as Katigen Brilliant Blue GGS High Conc. and Indo Carbon CLFS; and premetalized dyestuffs including Cibalan Yellow GRL and Supralan Blue NB and the like.

The dyed products, especially textile fiber products, are generally lightfast and are well imbued with good resistance to crocking. In addition, dyed textile fiber products exhibit good washfastness despite repeated exposure and subjection to washing, laundering and dry cleaning treatments.

What is claimed is:

1. Process for improving the dyeability of fiber-forming acrylonitrile polymers that contain in the polymer molecule at least about 80 weight percent of acrylonitrile, any balance being another ethylenically unsaturated monomer that is copolymerizable with acrylonitrile, which process comprises (1) preparing a fiber-forming acrylonitrile polymer in aquagel form; (2) incorporating in said aquagel a minor proportion of a monoethylenically unsaturated N-vinyl heterocyclic monomeric compound selected from the group of N-vinyl cyclic amides and N-vinyl cyclic carbamates which consists of those and mixtures thereof having the structural formulae:

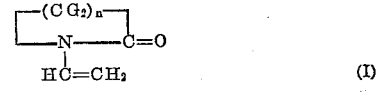 (I)

 (II)

and

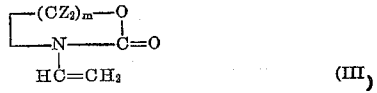 (III)

wherein each G is independently selected from the group consisting of hydrogen and alkyl radicals of from 1 to about 4 carbon atoms; each Z is independently selected from the group consisting of hydrogen, alkyl radicals of from 1 to about 4 carbon atoms, and aryl radicals containing from 6 to about 10 carbon atoms; $n$ is an integer from 3 to 5; and $m$ is an interger from 2 to 3; (3) exposing the monomer-impregnated acrylonitrile polymer aquagel substrate to a field of high energy ionizing radiation at a temperature between about 10 and 100° C. until a dosage between about 0.2 and 10 megarads is effected; then (4) subsequently, within about 120 seconds after the termination of exposure of said monomer-impregnated acrylonitrile polymer aquagel substrate to said high energy radiation, subjecting said monomer-impregnated substrate to heat at an actual substrate temperature between about 90 and 102° C. for a period of time between about 180 and 20 seconds without irreversibly drying said aquagel structure whereby a graft copolymer of said N-vinyl heterocyclic monomer is formed on said acrylonitrile polymer substrate.

2. The process of claim 1, wherein the acrylonitrile polymer aquagel is in the form of a shaped article.

3. The process of claim 1, wherein the acrylonitrile polymer aquagel is in the form of a filamentary shaped article.

4. The process of claim 1, wherein said monomer-impregnated aquagel is exposed to said field of high energy radiation until a total dosage of between about 0.4 and 5 megarads has been effected.

5. The process of claim 1, wherein said irradiated monomer-impregnated aquagel is subjected to heat at an actual substrate temperature between about 90 and 102°

C. for a period of time between about 90 and 20 seconds within not more than about 30 seconds' delay after the termination of said exposure to high energy radiation.

6. The process of claim 1, wherein said N-vinyl heterocyclic monomer is impregnated into said acrylonitrile polymer aquagel substrate from a solution of said monomer in a solvent therefor that has a swelling influence on said substrate and which does not materially inhibit polymerization.

7. A process according to the process set forth in claim 6, wherein said monomer is impregnated from an aqueous solution.

8. A process according to the process set forth in claim 7, wherein said aqueous solution of said monomer contains between about 1.5 and 20 weight percent, based on the weight of the solution, of dissolved monomer.

9. A process according to the process set forth in claim 8, wherein said N-vinyl heterocyclic monomer is N-vinyl-2-pyrrolidone.

10. A process according to the process set forth in claim 8, wherein said N-vinyl heterocyclic monomer is N-vinyl-5-methyl-2-oxazolidinone.

11. A process according to the process set forth in claim 8, wherein said N-vinyl heterocyclic monomer is N-vinyl-3-morpholinone.

12. The process of claim 1, wherein said impregnation of the monomer into said aquagel, said irradiation of said monomer-impregnated aquagel, and said subsequent heat treatment of the irradiated monomer-impregnated aquagel are performed in an atmosphere that is substantially free from oxygen.

13. A process in accordance with the process set forth in claim 12, wherein the oxygen content of the atmosphere in which said impregnation, irradiation and heat treating steps are performed is less than about 1 percent by volume.

14. The process of claim 1, wherein said monomer is incorporated in said acrylonitrile polymer aquagel substrate from an aqueous solution of said monomer that contains between about 1.5 and 20 weight percent, based on the weight of the solution, of dissolved monomer and wherein the pH or said aqueous solution of monomer is maintained between about 5 and 11.

15. A process in accordance with the process set forth in claim 14 and including the additional step of incorporating in said aqueous solution of monomer a minor proportion that is a quantity in the amount of up to about 1 percent by weight, based on the weight of said solution, of an additive selected from the group consisting of alkali metal phosphates, phosphites, sulfates, sulfites, bisulfites and mixtures thereof.

16. A process in accordance with the process set forth in claim 15, wherein said additive is a mixture of sodium sulfite and sodium tribasic phosphate.

17. The process of claim 1, wherein said acrylonitrile polymer is polyacrylonitrile.

18. The process of claim 1, wherein said acrylonitrile polymer is polyacrylonitrile and said N-vinyl heterocyclic monomer is N-vinyl-2-pyrrolidone.

References Cited in the file of this patent

UNITED STATES PATENTS 2,713,573   Schildknecht et al. -------- July 19, 1955

FOREIGN PATENTS 66,034   France ---------------- Dec. 12, 1955
         (Addition to No. 1,079,401)

OTHER REFERENCES

Brookhaven National Laboratory Report No. 375, page 26, April 1956.